(12) United States Patent
Ponnuswamy et al.

(10) Patent No.: US 12,531,849 B2
(45) Date of Patent: Jan. 20, 2026

(54) DYNAMIC AUTHENTICATION FOR LOCAL ACCOUNTS BASED ON SECURITY INFORMATION AND EVENT MANAGEMENT SYSTEMS

(71) Applicant: Dell Products L.P., Round Rock, TX (US)

(72) Inventors: Senthil Ponnuswamy, San Jose, CA (US); Kiran Kumar Malle Gowda, Bangalore (IN)

(73) Assignee: Dell Products L.P., Houston, TX (US)

( * ) Notice: Subject to any disclaimer, the term of this patent is extended or adjusted under 35 U.S.C. 154(b) by 92 days.

(21) Appl. No.: 18/646,179

(22) Filed: Apr. 25, 2024

(65) Prior Publication Data

US 2025/0337725 A1     Oct. 30, 2025

(51) Int. Cl.
  *G06F 7/04*      (2006.01)
  *H04L 9/40*      (2022.01)

(52) U.S. Cl.
  CPC ........ *H04L 63/0823* (2013.01); *H04L 63/083* (2013.01)

(58) Field of Classification Search
  CPC ..... H04L 63/0823; H04L 9/088; H04L 63/20; G06F 21/31; G06F 21/45; G06F 21/46
  See application file for complete search history.

(56) References Cited

U.S. PATENT DOCUMENTS

| | | | | |
|---|---|---|---|---|
| 8,856,879 B2 * | 10/2014 | Schechter | ............ | G06Q 50/265 |
| | | | | 348/E7.071 |
| 2005/0021975 A1 * | 1/2005 | Liu | .................... | H04L 63/0281 |
| | | | | 713/182 |
| 2010/0169957 A1 * | 7/2010 | Zurko | ..................... | G06F 21/31 |
| | | | | 726/5 |
| 2020/0364342 A1 * | 11/2020 | Martinez | ................. | G06F 9/441 |
| 2021/0288981 A1 * | 9/2021 | Numainville | ....... | H04L 63/1416 |
| 2025/0150451 A1 * | 5/2025 | Lakunishok | ........ | H04L 63/0846 |

OTHER PUBLICATIONS

Grosse et al. Authentication at Scale, Dec. 13, 2012, IEEE, pp. 15-22. (Year: 2012).*
Morais et al, Adaptive, Multi-Factor Authentication as a Service for Web Applications, Oct. 18, 2023, IEEE, pp. 74-80 (Year: 2023).*

* cited by examiner

*Primary Examiner* — Philip J Chea
*Assistant Examiner* — Jenise E Jackson
(74) *Attorney, Agent, or Firm* — Chamberlain, Hrdlicka, White, Williams & Aughtry; Aly Z. Dossa (57) ABSTRACT

Techniques described herein relate to a method managing accounts in a cluster. The method includes identifying, by an alert manager, an account login alert associated with an account and a node of a cluster, wherein the cluster comprises a plurality of nodes, wherein the node is one of the plurality of nodes; in response to the identification: making a first determination that the account login alert exceeds an alert threshold; in response to the first determination: disabling a weak authentication method for the account; enabling a strong authentication method for the account; disabling weak authentication methods for other accounts on the plurality of nodes; enabling strong authentication methods for other accounts on the plurality of nodes; making a second determination the account is associated with multiple sessions; and in response to the second determination: closing the multiple sessions associated with the account.

17 Claims, 7 Drawing Sheets

DYNAMIC AUTHENTICATION FOR LOCAL ACCOUNTS BASED ON SECURITY INFORMATION AND EVENT MANAGEMENT SYSTEMS

BACKGROUND

Computing devices may provide services for users. To obtain the services, the may use accounts to access the services. It may be desirable to protect data generated by the computing devices, the computing devices, and the users. To protect the data, computing devices, and the users, the users may require authentication to access the computing devices. There may be different forms of authentication.

SUMMARY

In general, in one aspect, the embodiments disclosed herein relate to a method performed to manage accounts in a cluster. The method includes identifying, by an alert manager, an account login alert associated with an account and a node of a cluster, wherein the cluster comprises a plurality of nodes, wherein the node is one of the plurality of nodes; in response to the identification: making a first determination that the account login alert exceeds an alert threshold; in response to the first determination: disabling a weak authentication method for the account; enabling a strong authentication method for the account; disabling weak authentication methods for other accounts on the plurality of nodes; enabling strong authentication methods for other accounts on the plurality of nodes; making a second determination the account is associated with multiple sessions; and in response to the second determination: closing the multiple sessions associated with the account.

In general, in one aspect, the embodiments described herein relate to a non-transitory computer readable medium which includes computer readable program code, which when executed by a computer processor enables the computer processor to perform a method for managing accounts in a cluster. The method includes identifying, by an alert manager, an account login alert associated with an account and a node of a cluster, wherein the cluster comprises a plurality of nodes, wherein the node is one of the plurality of nodes; in response to the identification: making a first determination that the account login alert exceeds an alert threshold; in response to the first determination: disabling a weak authentication method for the account; enabling a strong authentication method for the account; disabling weak authentication methods for other accounts on the plurality of nodes; enabling strong authentication methods for other accounts on the plurality of nodes; making a second determination the account is associated with multiple sessions; and in response to the second determination: closing the multiple sessions associated with the account.

In general, in one aspect, embodiments described herein relate to a system for managing accounts in a cluster. The system includes a plurality of nodes in a cluster and an alert manager of a security information and event manager that includes a processor and memory and is configured to perform a method. The method includes identifying, by the alert manager, an account login alert associated with an account and a node of a cluster, wherein the cluster comprises a plurality of nodes, wherein the node is one of the plurality of nodes; in response to the identification: making a first determination that the account login alert exceeds an alert threshold; in response to the first determination: disabling a weak authentication method for the account; enabling a strong authentication method for the account; disabling weak authentication methods for other accounts on the plurality of nodes; enabling strong authentication methods for other accounts on the plurality of nodes; making a second determination the account is associated with multiple sessions; and in response to the second determination: closing the multiple sessions associated with the account.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of a security information and event manager in accordance with one or more embodiments disclosed herein.

FIGS. 3.1-3.3 show a diagram of an example in accordance with one or more embodiments disclosed herein.

DETAILED DESCRIPTION

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for managing security of accounts in a cluster.

Local accounts are specific to a computing device or domain, and are often used as Accounts of Last Resort (ALRs) or a "Breakglass" accounts in emergency situations. As used herein, a local account may refer to a user account for a computing device or a domain in a cluster. For genuine use cases when an identity provider (IdP) is down or a network is down, strong authentication methods like multifactor authentication (MFA) and single sign-on (SSO) are disabled for ALR accounts to access computing devices, domains, and/or information therein. Thus, during an attack, an ALR or a user account becomes a weak link in user authentication and adversaries may be able to exploit this weakness to cause damage to the cluster, steal information, and/or perform other nefarious actions without departing from embodiments disclosed herein.

To address, at least in part, the aforementioned issues discussed above, embodiments disclosed herein relate to systems, methods, and/or non-transitory computer readable mediums that enable dynamic authentication for user accounts in a cluster. More specifically, embodiments disclosed herein may automatically change authentication methods for user accounts across the cluster to strong authentication methods during a potential attack or breach of the cluster. As a result, the security of the cluster may be improved.

Figure 11:
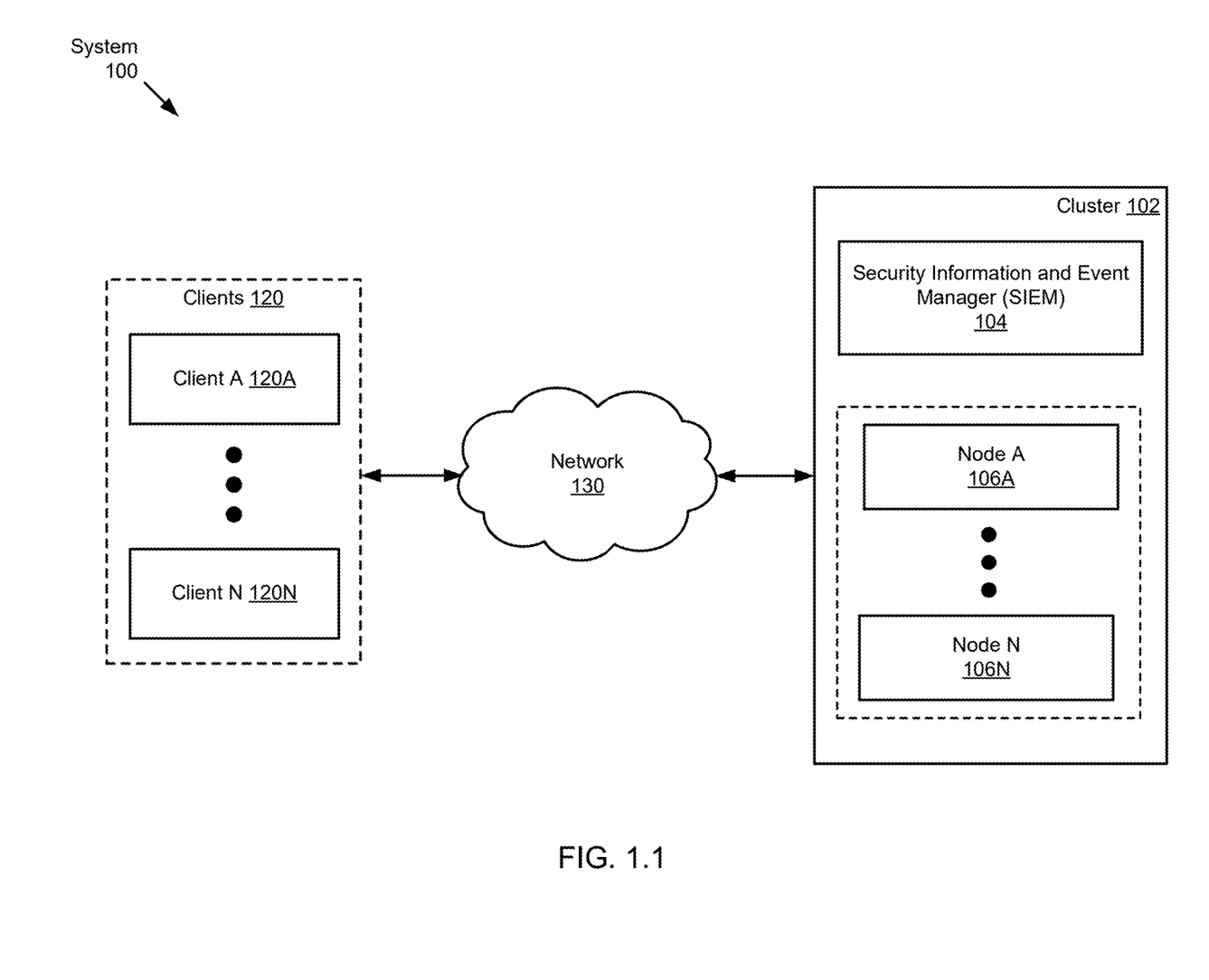

FIG. 1.1 shows a diagram a system in accordance with one or more embodiments disclosed herein. The system may include a cluster (102), clients (120), and a network (130). The components of the system illustrated in FIG. 1.1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1.1 is discussed below.

In one or more embodiments, the clients (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the clients (120) described herein and/or all, or a portion, of the methods illustrated in FIG. 2. The clients (120) may be implemented using other types of computing devices without departing from the embodiments disclosed herein. For additional details regarding computing devices, refer to FIG. 4.

The clients (120) may be implemented using logical devices without departing from the embodiments disclosed herein. For example, the clients (120) may include virtual machines that utilize computing resources of any number of physical computing devices to provide the functionality of the clients (120). The clients (120) may be implemented using other types of logical devices without departing from the embodiments disclosed herein.

In one or more embodiments, the clients (120) may include the functionality to, or otherwise be programmed or configured to, perform computer implemented services for users of the clients (120). The computer implemented services may include electronic mail communication services, database services, calendar services, inferencing services, and/or word processing services. The computer implemented services may include other and/or additional types of services without departing from embodiments disclosed herein. The clients (120) may also include the functionality to obtain other computer implemented services from the cluster (102). The cluster (102) may include additional computing resources (e.g., computing processors, memory, storage, etc.) and may be able to provide more quantities of computer implemented services and/or more complex computer implemented services (e.g., machine learning model training, long term backup storage, data redundancy, etc.). The computer implemented services obtained by the clients (120) from the cluster (102) may include the aforementioned computer implemented services and/or any other types of computer implemented services without departing from embodiments disclosed herein. The clients (120) may include the functionality to perform all, or a portion of, the methods discussed in FIG. 2. The clients (120) may include other and/or additional functionalities without departing from embodiments disclosed herein.

The clients (120) may include any quantity of clients without departing from embodiments disclosed herein. For example, the clients (120) may include client A (120A) and client N (120N). In one or more embodiments, each client (e.g., 120A) may include one or more users that use the clients to access and obtain computer implemented services from nodes (e.g., discussed below) of the cluster (102). Each user may be associated with a user account (discussed below) to access one or more nodes in the cluster (102).

Resuming the discussion of the system (100), in one or more embodiments, the cluster (102) may provide computer implemented services for users of the clients (120). The cluster (102) may include one or more nodes that provide computer implemented services for the clients (120). The cluster (102) may include any quantity of nodes without departing from embodiments disclosed herein. For example, the cluster (102) may include node A (106A) and node N (106N). The cluster (102) may also include, or may be operatively connected to, a security information and event manager (SIEM) (104). The cluster (102) may include fewer, additional, and/or other components without departing from embodiments disclosed herein. The aforementioned components of the cluster are discussed below.

In one or more embodiments, a node (e.g., 106A, 106N) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIG. 2. The node (e.g., 106A, 106N) may be implemented using other types of computing devices without departing from embodiments disclosed herein. For additional details regarding computing devices, refer to FIG. 4.

The node (e.g., 106A, 106N) may be implemented using logical devices without departing from the embodiments disclosed herein. For example, the node (e.g., 106A, 106N) may include virtual machines that utilize computing resources of any number of physical computing devices to provide the functionality of the node (e.g., 106A, 106N). The node (e.g., 106A, 106N) may be implemented using other types of logical devices without departing from the embodiments disclosed herein.

In one or more embodiments, the nodes (e.g., 106A, 106N) of the cluster (102) may include the functionality to perform and provide the computer implemented services of the cluster (102) for the users of the clients (120). As such, the nodes (e.g., 106A, 106N) may include the functionality to perform the following services: electronic mail communication services, database services, calendar services, inferencing services, word processing services, machine learning model training services, long term backup storage services, data redundancy services, data deduplication services, data compression services, etc. The nodes (e.g., 106A, 106N) may include the functionality to perform other and/or additional services without departing from embodiments disclosed herein. In one or more embodiments, each node of the nodes (e.g., 106A, 106N) may perform the same computer implemented services or different computer implemented services. Additionally, each node of the nodes (e.g., 106A, 106N) may perform the computer implemented services independently of other nodes or together with other nodes in an orchestrated manner (e.g., the computer implemented services may be spread across multiple nodes). In one or more embodiments, to perform the computer implemented services the nodes (e.g., 106A, 106N) may send/obtain requests and information to/from the clients (120).

In one or more embodiments, to obtain the computer implemented services or otherwise access the nodes, users may be authenticated prior to granting access to the nodes (e.g., 106A, 106N). Accordingly, users may be associated with user accounts that specify a user's identity and include authentication methods that may be used to grant access to one or more nodes (e.g., 106A, 106N) for the corresponding user. The user accounts may include a user identifier (e.g., a unique combination of alphanumeric characters associated with a specific user), username or other identification parameters associated with a user.

Additionally, in one user accounts may include both strong authentication methods and weak authentication methods used to grant users access to the nodes (e.g., 106A, 106N) during user logins to the nodes (e.g., 106A, 106N). A user login may include a user providing a user identification and/or performing an authentication method to attempt to gain access to the nodes (e.g., 106A, 106N). Strong authentication methods may provide more security for the cluster and the user at the cost of increased complexity, computing resources, and user time to perform the authentication methods. Weak authentication methods may be more efficient, but sacrifice the high levels of security associated with strong authentication methods. It may be easier for a user to authenticate themselves using a weaker authentication method compared to a stronger authentication method. However, it may be more difficult for nefarious entities (e.g., hackers, malware, viruses, etc.) to breach the strong authentication methods compared to weaker authentication methods. Weak authentication methods may include, for example, providing a username and password, entering a passcode, answering a security question, etc. Weak authentication methods may include other and/or additional less secure authentication methods without departing from embodiments disclosed herein. Strong authentication methods may include, for example, multi-factor authentication (MFA), single sign-on (SSO), requiring physical access to the node (e.g., login through a serial console at the physical location of the node, insert an authentication device (e.g., USB drive) into the node, etc.), providing biometric information (e.g., eye scan, face scan, fingerprint, etc.), providing a pre-attack configured custom digital certificate for emergency authentication, etc.

In one or more embodiments, the security information and event manager (SIEM) (104) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIG. 2. The SIEM (104) may be implemented using other types of computing devices without departing from embodiments disclosed herein. For additional details regarding computing devices, refer to FIG. 4.

In one or more embodiments, the SIEM (104) may be implemented using logical devices without departing from embodiments disclosed herein. For example, the SIEM (104) may include virtual machines that utilize computing resources of any number of physical computing devices to provide the functionality of the SIEM (104). The SIEM (104) may be implemented using other types of logical devices without departing from the embodiments disclosed herein.

In one or more embodiments, the SIEM (104) may be implemented as an application or other software program (e.g., computing instructions) executing on a computing device of the cluster (102) (e.g., a node (e.g., 106A)) or a computing device operatively connected to the cluster (102) (not shown).

Figure 12:
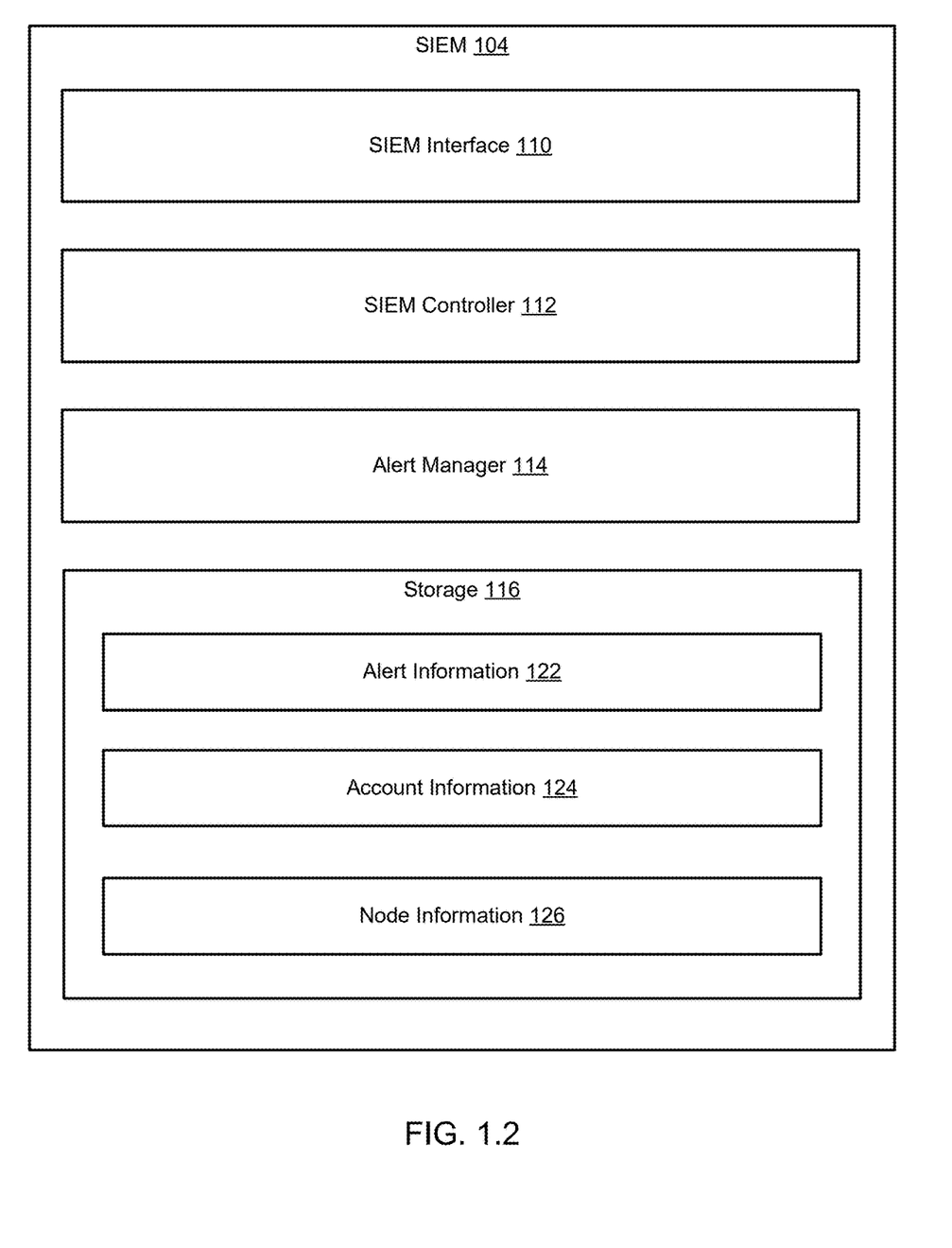

In one or more embodiments, the SIEM (104) may include the functionality to perform security management services for the cluster (102). The security management services may include, for example, (i) monitoring and tracking user login attempts to nodes (e.g., 106A, 106N) of the cluster (102), (ii) identifying user login failures and potential attacks on the cluster, (iii) switching between weak and strong authentication methods for the nodes based on user login attempts if there is a potential attack on the cluster (102), and/or (iv) reverting back to weak authentication methods after user login failures or potential cluster attacks have been resolved. The security management services may include other and/or additional services without departing from embodiments disclosed herein. The SIEM (104) may include the functionality to perform all, or a portion of, the methods of FIG. 2 without departing from embodiments disclosed herein. For additional information regarding the functionality of the SIEM (104), refer to FIG. 2. The SIEM (104) may include other and/or additional functionalities without departing from embodiments disclosed herein. For additional information regarding the SIEM (104), refer to FIG. 1.2.

In one or more embodiments, the network (130) may be implemented using may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the network (130) described herein and/or all, or a portion, of the methods illustrated in FIG. 2. The network (130) may be implemented using other types of computing devices without departing from the embodiments disclosed herein. For additional details regarding computing devices, refer to FIG. 4.

The network (130) may be implemented using logical devices without departing from the embodiments disclosed herein. For example, the network (130) may include virtual machines that utilize computing resources of any number of physical computing devices to provide the functionality of the network (130). The network (130) may be implemented using other types of logical devices without departing from the embodiments disclosed herein.

In one or more embodiments, the network (130) may represent a (decentralized or distributed) computing network and/or fabric configured for computing resource and/or messages exchange among registered computing devices (e.g., the clients (120), the SIEM (104) and the nodes (e.g., 106A, 106N), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients (120), the SIEM (104) and the nodes (e.g., 106A, 106N) through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of milliseconds or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Although the system (100) of FIG. 1.1 is shown as having a certain number of components (e.g., 102, 104, 106A, 106N, 120, 130), in other embodiments disclosed herein, the system (100) may have more or fewer components. For example, the functionality of each component described above may be split across components or combined into a single component. Further still, each component may be utilized multiple times to carry out an iterative operation.

FIG. 1.2 shows a diagram of a security information and event manager in accordance with one or more embodiments disclosed herein. The SIEM (104) may be an embodiment of the SIEM (104, FIG. 1.1) discussed above. As discussed above, the SIEM (104) may include the functionality to perform security management services for the cluster (102, FIG. 1.1). To perform the aforementioned services, the SIEM (104) may include a SIEM interface (110), SIEM controller (112), alert manager (114), and storage (116). The SIEM (104) may include other, additional, and/or fewer components without departing from embodiments disclosed herein. Each of the aforementioned components of the SIEM (104) is discussed below.

In one or more embodiments disclosed herein, the SIEM interface (110) may represent an application programming interface (API) (e.g., a communication channel, an entry point to the SIEM, etc.) for the SIEM (104). To that extent, the SIEM interface (110) may employ a set of subroutine definitions, protocols, and/or hardware/software components for enabling communications between the SIEM (104) and external entities (e.g., the clients (e.g., 120A, 120N), nodes (e.g., 106A, 106N), etc.). One of ordinary skill will appreciate that the SIEM interface (110) may perform other functionalities without departing from the scope of the invention. The SIEM interface (110) may be implemented using hardware, software, or any combination thereof.

In one or more embodiments disclosed herein, the SIEM controller (112) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the SIEM controller (112) described throughout this Detailed Description.

In one or more embodiments disclosed herein, the SIEM controller (112) may be implemented as computer instructions, e.g., computer code, stored on a storage (e.g., 116) that when executed by a processor of the SIEM (104) causes the SIEM (104) to provide the functionality of the SIEM controller (112) described throughout this Detailed Description.

In one or more embodiments, the SIEM controller (112) may include the functionality to perform a first portion of the security management services of the SIEM (104). The portion of the security management services performed by the SIEM controller (112) may include (i) monitoring and tracking user login attempts to the nodes (e.g., 106A, 106N, FIG. 1.1) of the cluster (102, FIG. 1.1), (ii) obtaining information from nodes (e.g., 106A, 106N, FIG. 1.1) and clients (120, FIG. 1.1), etc. The SIEM controller (112) may include other and/or additional functionalities without departing from embodiments disclosed herein.

In one or more embodiments disclosed herein, the alert manager (114) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the alert manager (114) described throughout this Detailed Description.

In one or more embodiments disclosed herein, the alert manager (114) is implemented as computer instructions, e.g., computer code, stored on a storage (e.g., 116) that when executed by a processor of the SIEM (104) causes the SIEM (104) to provide the functionality of the alert manager (114) described throughout this Detailed Description.

In one or more embodiments disclosed herein, the alert manager (114) may include the functionality to perform the other portion of the security management services of the SIEM (104). Accordingly, the alert manager (114) may include the functionality to (i) identify user login attempt failures and potential attacks on the cluster (102, FIG. 1.1), (ii) switching between weak and strong authentication methods for the nodes based on user login attempts if there is a potential attack on the cluster (102, FIG. 1.1), (iv) reverting back to weak authentication methods after user login failures or potential cluster attacks have been resolved, (v) identifying and closing user sessions across the cluster (102, FIG. 1.1) associated with user login failures and potential attacks, etc. The alert manager (114) may include other and/or additional functionalities without departing from embodiments disclosed herein. For additional information regarding the functionality of the alert manager (114), refer to FIG. 2.

In one or more embodiments, the storage (116) may be implemented using one or more volatile or non-volatile storages or any combination thereof. The storage (116) may include the functionality to, or otherwise be configured to, store and provide all, or portions, of information that may be used by the SIEM interface (110), SIEM controller (112), and/or the alert manager (114). The information stored in the storage (116) may include alert information (122), account information (124), and node information (126). The storage (116) may include other and/or additional information without departing from embodiments disclosed herein. Each of the aforementioned types of information is discussed below.

In one or more embodiments, the alert information (122) may include one or more data structures that include information associated with user login attempts made for nodes (e.g., 106A, 106N, FIG. 1.1) of the cluster (102, FIG. 1.1). The information may include, for each login attempt, a timestamp (e.g., the point in time the login attempt was made), the user identifier associated with the user that made the login attempt, authentication method identifier associated with the authentication method used for the login attempt, the client identifier associated with the client used to make the attempt, and/or one or more node identifiers associated with the nodes targeted by the login attempts. The information may further include user configurable alert thresholds. The user configuration alert threshold may specify a quantity of user login failures and/or a time period associated with the user login failures which may be used to identify whether a user login alert has occurred. The alert information (122) may be generated by the SIEM controller (112) during monitoring of the user login attempts and by a user (e.g., a system administrator). The alert information (122) may be used by the alert manager (114) to identify user login failure alerts. The alert information (122) may include other and/or additional information associated with user login attempts without departing from embodiments disclosed herein.

In one or more embodiments, the account information (124) may include one or more data structures that include information regarding user accounts. The information may include, for example, one or more account entries. Each account entry may include information associated with the corresponding account. The information may include user identifiers associated with the account, an account type (e.g., user account, identity provider (IdP) account, account of last resort (ALR), administrator account, etc.), a weak authentication method type, a strong authentication method type, and/or one or more session identifiers associated with the account. The account entry may include other and/or additional information associated with the corresponding user account without departing from embodiments disclosed herein. The account information may be generated by clients (120, FIG. 1.1) (e.g., users) and provided to the SIEM when new accounts are generated. The account information (124) may be used to perform security management services without departing from embodiments disclosed herein. The account information (124) may include other and/or additional information without departing from embodiments disclosed herein.

In one or more embodiments, the node information (126) may include one or more data structures that include information regarding the nodes (e.g., 106A, 106N, FIG. 1.1) of the cluster (102). The information may include, for each node, a node identifier, workloads, services, or software programs executing on the node, session identifiers associated with active user sessions and the corresponding user identifiers associated with the active user sessions, and/or communication information (e.g., network addresses, port numbers, digital certificates, tokens, encryption keys, etc.). The node information (126) may be generated by the nodes (e.g., 106A, 106N, FIG. 1.1) and provided to the SIEM (104). The node information (126) may be used to perform security management services. The node information (126) may include other and/or additional information without departing from embodiments disclosed herein.

While the data structures (e.g., 122, 124, 126) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (116), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2:
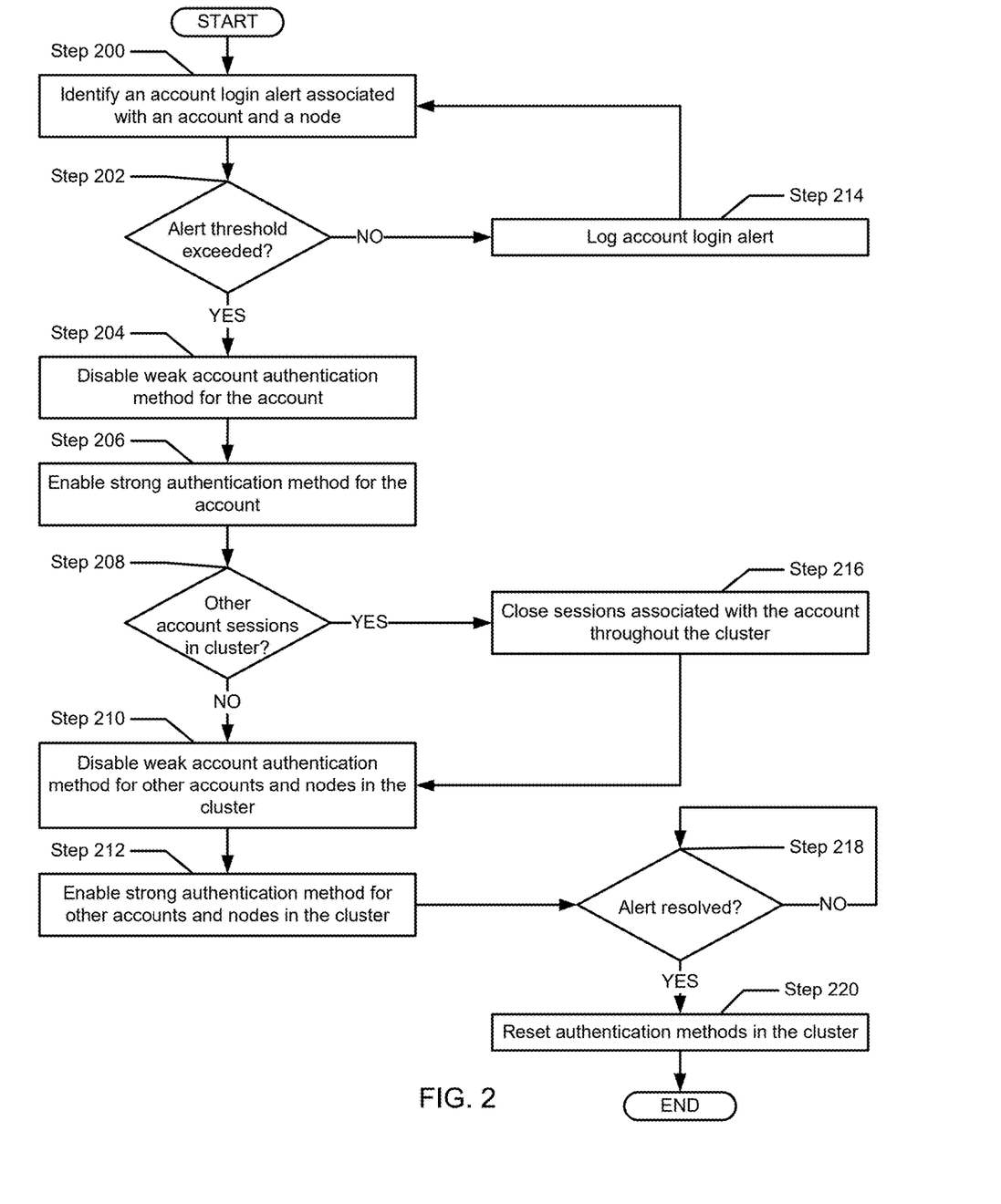
FIG. 2 shows a flowchart of a method for managing authentication in a cluster in accordance with one or more embodiments disclosed herein.

FIG. 2 shows a flowchart of a method for managing authentication in a cluster in accordance with one or more embodiments disclosed herein. The method shown in FIG. 2 may be performed by, for example, an alert manager of a SIEM (e.g., 114, FIG. 1.2). Other components of the system in FIGS. 1.1-1.2 may perform all, or a portion, of the method of FIG. 2 without departing from the scope of the embodiments described herein. While FIG. 2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, an account login alert associated with an account and a node is identified. In one or more embodiments, the SIEM controller may monitor all user login attempts for the nodes of the cluster and generate or obtain alert information associated with user login attempts. The alert manager may track the generated alert information and identify a failed user login attempt made by a user of an account while attempting to access a node of the cluster. The identification of a failed user login attempt may include identifying an account login alert. The account login alert associated with an account and a node may be identified via other and/or additional methods without departing from embodiments disclosed herein.

In Step 202, a determination is made as to whether an alert threshold is exceeded. In one or more embodiments, the alert manager may obtain additional alert information associated with the account and the node corresponding the account login alert to determine whether an alert threshold is exceeded. The additional alert information may include information regarding previous user login failures by the same user account on the same node. Additionally, the alert manager may obtain an alert threshold. The alert threshold may be specific to the user account and/or node or may be a general alert threshold used for the entire cluster and all user accounts. As discussed above, the alert threshold may include a quantity of failed login attempts and a time period associated with the failed login attempts. In one or more embodiments, if the alert information associated with the current account login alert and the additional alert information associated with previous account login alerts indicate that the account has experienced a quantity of user account login failures that equals the quantity specified by the alert threshold within the time period specified by the alert threshold, then the alert manager may determine that the alert threshold is exceeded. In one or more embodiments, if the alert information associated with the current account login alert and the additional alert information associated with previous account login alerts indicate that the account has experienced a quantity of user account login failures that is less than the quantity specified by the alert threshold or is outside the time period specified by the alert threshold, then the alert manager may determine that the alert threshold is not exceeded. The determination as to whether an alert threshold is exceeded may be made via other and/or additional methods without departing from embodiments disclosed herein.

In one or more embodiments, if it is determined that an alert threshold is exceeded, then the method proceeds to Step 204. In one or more embodiments, if it is determined that an alert threshold is not exceeded, then the method proceeds to Step 214.

In Step 204, weak account authentication method for the account is disabled. In one or more embodiments, the alert manager may disable the weak authentication method for the account. The alert manager may tag, flag, or otherwise indicate that the weak authentication method associated with the user is disabled in the account information associated with the account. In one or more embodiments the alert manager may identify all nodes associated with the account using the account information and may send requests to the nodes to disable all weak authentication methods for the account. Accordingly, the user associated with the account may not be able to access the nodes using the weak authentication method associated with the user account. As an example, the alert manager may disable username and password authentication for the user and request all nodes associated with the account not to accept a username and password from the user when authenticating the account. Accordingly, the user (or an entity impersonating the user) would not be able to access the nodes of the cluster with the user's username and password. The weak authentication method for the account may be disabled via other and/or additional methods without departing from embodiments disclosed herein.

In Step 206, strong authentication method is enabled for the account. In one or more embodiments, the alert manager may enable the strong authentication method for the account. The alert manager may tag, flag, or otherwise indicate that the strong authentication method associated with the account is enabled in the account information associated with the account. In one or more embodiments the alert manager may identify all nodes associated with the account using the account information and may send requests to the nodes to enable all strong authentication methods for the account. Accordingly, the user associated with the account may only be able to access the nodes using the strong authentication method associated with the user account. As an example, the alert manager may enable physical authentication requiring a user to insert a designated authentication USB drive to the physical node to grant access to the desired node when authenticating the user and request all nodes associated with the account to only accept the aforementioned physical authentication when authenticating the account. Accordingly, the user (or an entity impersonating the user) would only be able to access the nodes of the cluster by inserting the USB drive into a node. The strong authentication method for the account may be enabled via other and/or additional methods without departing from embodiments disclosed herein.

In Step 208, a determination is made as to whether other account sessions are in the cluster. In one or more embodiments, the alert manager may check the account information associated with the account to identify any open sessions on any of the nodes of the cluster. As discussed above, the account information may specify all open sessions associated with the account. In one or more embodiments, if there are open sessions specified in the account information associated with the account, then the alert manager may determine that there are other account sessions in the cluster. In one or more embodiments, if there are no open sessions specified in the account information associated with the account, then the alert manager may determine that there are no other account sessions in the cluster. The determination as to whether there are other account sessions in the cluster may be made via other and/or additional methods without departing from embodiments disclosed herein.

In one or more embodiments, if it is determined that there are other account sessions in the cluster, then the method proceeds to Step 216. In one or more embodiments, if it is determined that there are no other account sessions in the cluster, then the method proceeds to Step 210.

In Step 210, weak authentication method is disabled for other accounts and nodes in the cluster. In one or more embodiments, the alert manager may disable the weak authentication method for all other accounts associated with the cluster. The alert manager may tag, flag, or otherwise indicate that the weak authentication method associated with the other users is disabled in the account information associated with the accounts. In one or more embodiments the alert manager may identify all nodes associated with each account using the account information and may send requests to the nodes to disable all weak authentication methods for each account. Accordingly, the user associated with each account may not be able to access the nodes using the weak authentication method associated with the user account. As an example, the alert manager may disable username and password authentication for all users (or any other weak authentication method associated with each user's account) and request all nodes associated with the accounts not to accept a username and password from the users when authenticating the accounts. Accordingly, no user (or an entity impersonating the user) would be able to access the nodes of the cluster with the user's username and password. The weak authentication method for other accounts and nodes in the cluster may be disabled via other and/or additional methods without departing from embodiments disclosed herein.

In Step 212, strong authentication for other accounts and nodes in the cluster are enabled. In one or more embodiments, the alert manager may enable the strong authentication method for all other accounts associated with the cluster. The alert manager may tag, flag, or otherwise indicate that the strong authentication method associated with the other users is enabled in the account information associated with the accounts. In one or more embodiments the alert manager may identify all nodes associated with each account using the account information and may send requests to the nodes to enable all strong authentication methods for each account. Accordingly, the user associated with each account may only be able to access the nodes using the strong authentication method associated with the user account. As an example, the alert manager may enable custom certificate authentication for all users (or any other strong authentication method associated with each user's account) and request all nodes associated with the accounts to accept custom digital certificates associated with the users and generated prior to the account login alert when authenticating the accounts. Accordingly, each user (or an entity impersonating the user) would be able to access the nodes of the cluster only by presenting a custom digital certificate associated with the user during authentication. The strong authentication method for other accounts and nodes in the cluster may be enabled via other and/or additional methods without departing from embodiments disclosed herein.

In Step 214, the account login alert is logged. In one or more embodiments, the alert manager may log the account login alert by flagging, tagging, or otherwise specifying that the alert information associated with the account login alert in the alert corresponds to a user login failure. As such, the alert manager may use the alert information associated with the account login alert to determine whether an alert threshold is exceeded when subsequent account login alerts associated with the account are obtained. Additionally, users (e.g., security managers) may parse the logs to identify suspicious activity or when resolving account login alerts. The account login alert may be logged via other and/or additional methods without departing from embodiments disclosed herein. In one or more embodiments, the method proceeds to Step 200 following Step 214.

In Step 216, the sessions associated with the account are closed throughout the cluster. As discussed above, the account information may include node identifiers associated with the nodes on which the open sessions associated with account are executing. In one or more embodiments, the alert manager may identify the nodes on which the open sessions are executing. The alert manager may then send requests (including the session identifier or user identifier) to the nodes to close or otherwise deactivate the sessions associated with the user account. In response to obtaining the requests, the nodes may close the open sessions associated with the account. As such, open sessions associated with the user account that experienced an account login alert may automatically be closed to prevent further damage to the user, the cluster, and/or the nodes. The sessions associated with the account may be closed throughout the cluster via other and/or additional methods without departing from embodiments disclosed herein.

In Step 218, a determination is made as to whether the alert is resolved. In one or more embodiments, the account login alert may be resolved by the successful login of the user associated with the account using the strong authentication method. The alert manager may monitor the alert information generated by the SIEM controller to identify the successful login by the user associated with the account. In alternative embodiments, the account login alert may be resolved by waiting a configurable period of time after the account login alert was identified. In yet still alternative embodiments, the account login alert may be resolved by obtaining confirmation from a trusted user (e.g., a system administrator). In one or more embodiments, if the user successfully logged in using the strong authentication method, a configurable time period has elapsed, or confirmation has been received by a trusted user, then the alert manager may determine that the alert is resolved. In one or more embodiments, if the user did successfully log in using the strong authentication method, a configurable time period has not elapsed, and confirmation has not been received by a trusted user, then the alert manager may determine that the alert is not resolved. The determination as to whether the alert is resolved may be made via other and/or additional methods without departing from embodiments disclosed herein.

In one or more embodiments, if it is determined if the alert is resolved, then the method proceeds to Step 220. In one or more embodiments, if it is determined if the alert is not resolved, then the method repeats Step 218 keeping the requirement of strong authentication methods for all accounts to maintain a high level of security for the cluster while the account associated with the account login alert may be compromised.

In Step 220, the authentication methods in the cluster are reset. In one or more embodiments, after the account login alert is resolved and the cluster is not under direct threat of being compromised, the alert manager may disable all strong authentication methods for all user account associated with the cluster and enable all weak authentication methods. Accordingly, users may now efficiently authenticate themselves using weak authentication methods while use of computational resources for authentication may be reduced by using the weak authentication methods. The alert manager may disable and enable the authentication methods via the methods discussed above in Steps 204, 206, 210, and 212 without departing from embodiments disclosed herein. The authentication methods in the cluster may be reset via other and/or additional methods without departing from embodiments disclosed herein.

In one or more embodiments, the method ends following Step 220.

Figure 31:
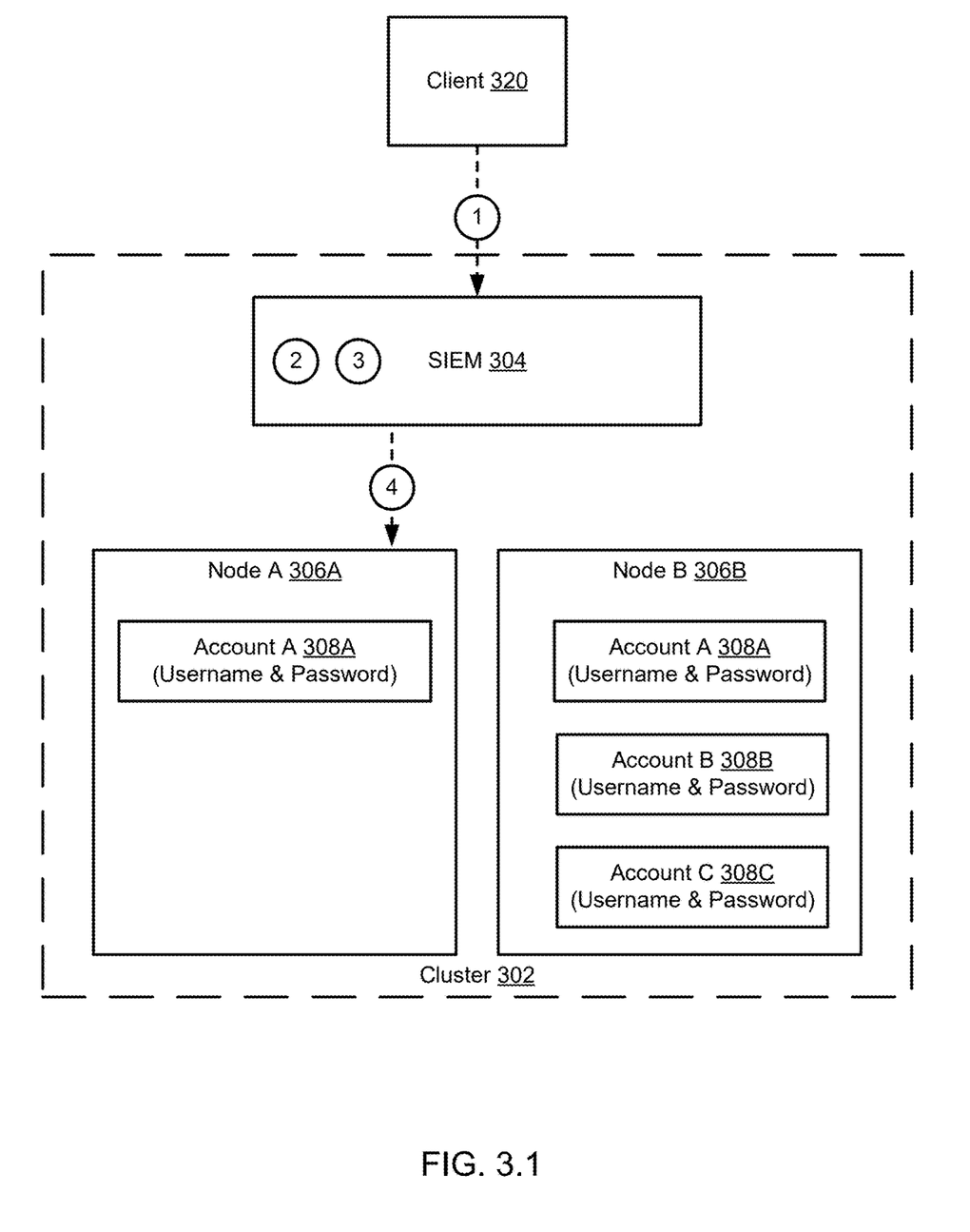
Figure 32:
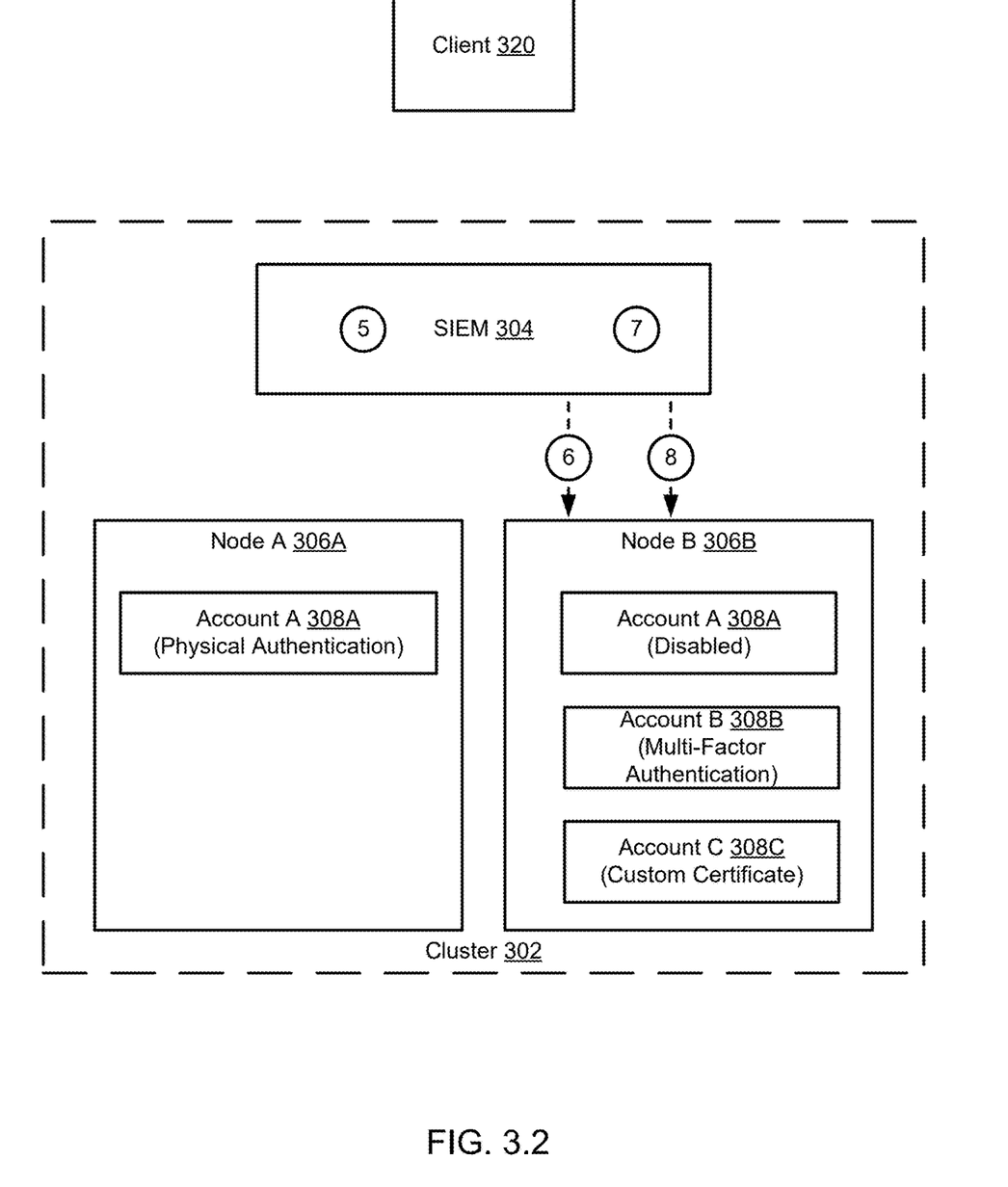
Figure 33:
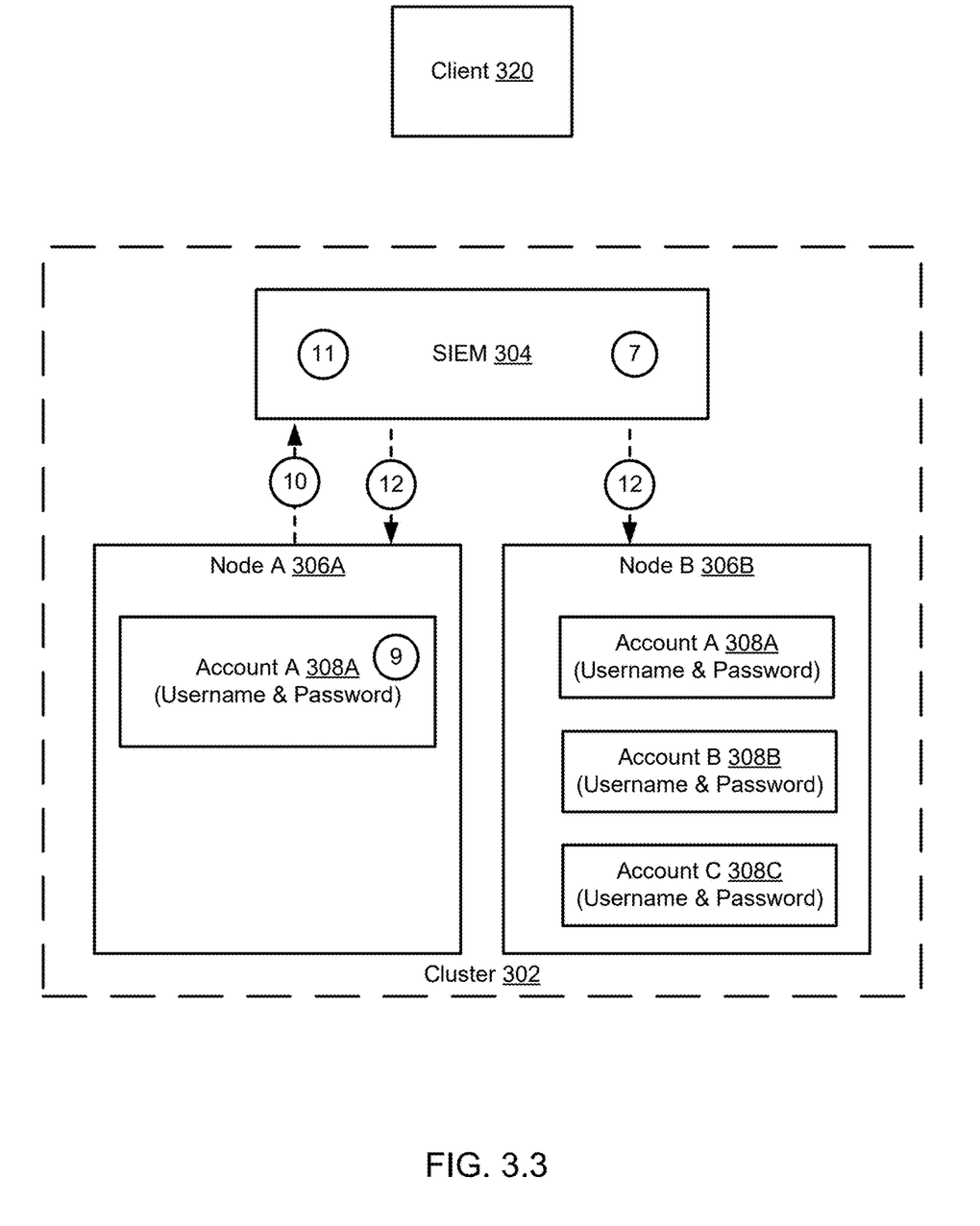

To further clarify embodiments of the invention, a non-limiting example use case is provided in FIGS. 3.1-3.3.

Start of Example

The example use case, illustrated in FIGS. 3.1-3.3, is not intended to limit the scope of the embodiments disclosed herein and is independent from any other examples discussed in this application. FIGS. 3.1-3.3 illustrate an example of performing security management in a cluster.

Turning now to FIG. 3.1, FIG. 3.1 shows a diagram of the example system at "time 0". For the sake of brevity, not all components involved in the example system may be discussed in FIG. 3.1.

The example system includes a client (320) that obtains computer implemented services from a cluster (302). The cluster (302) includes a SIEM (304), node A (306A), and node B (306B). Node A (306A) includes account A (308) which is currently set to a weak authentication method of username and password. Node B (306B) include account A (308A), account B (308B), and account C (308C), all of which are also set to the weak authentication method of username and password.

At a first point in time, at Step 1, a user with a user identity associated with account A (308A) attempts to login to node A (306A) using a username and password via the client (320). However, the login fails. Accordingly, at Step 2, the alert manager of the SIEM (304) identifies failed login attempt as an account login alert. In response, at Step 3, the alert manager determines that the account login alert exceeds an alert threshold. The user associated with this account experienced five login failures in two minutes which exceeds the alert threshold. In response to the determination, in Step 4, the alert manager disables the weak authentication method and enables the strong authentication method of physical authentication with an authentication USB drive for account A (308A) on node A (306A) based on the account information associated with account A (308A). After Step 4, the user associated with account A (308A) cannot login to Node A (306A) with the weak authentication method of username and password and must use the strong authentication method of physical authentication to access node A (306A).

Turning to FIG. 3.2, which is a continuation of the example of FIG. 3.1, at Step 5, the alert manager of the SIEM (304) then determines that other accounts are included on node B (306B). Accordingly, because the account login alert is associated with an exceeded alert threshold which indicates a potential attack or compromise of the cluster (302), at Step 6, the alert manager sends a request to node B (306B) to disable the weak authentication methods and enable the strong authentication methods based on the account information associated with each account. As such, account B (308B) is set to multi-factor authentication and account C (308C) is set to custom certificate authentication. After that, at Step 7, the alert manager determines that account A (308A) includes an open session on node B (306B). Because account A (308A) is associated with the account login alert, at Step 8, the alert manager requests that node B (306B) close the session associated with account A (308A). Therefore, account A (308A) is disabled on node B (306B).

Turning to FIG. 3.3, which shows a continuation of the example of FIG. 3.2, at Step 9, the user associated with account A (308A) successfully performs a login using the strong authentication (e.g., physical authentication using a USB drive). In response to the successful login, at Step 10, node A (306A) sends a notification to the SIEM (304) that the login was successful for account A (308A) using the strong authentication method. In response to obtaining the notification, at Step 11, the alert manager determines to reset the authentication methods to weak authentication methods for all accounts on the cluster because the account login alert has been resolved. In response to the determination, at Step 12, the authentication methods are reset for account A (308A), account B (308B), and account C (308C) on node A (306A) and node B (306B) to weak authentication methods. As such, the authentication methods for account A (308A), account B (308B), and account C (308C) are reset to username and password authentication. Furthermore, the session associated with account A (308A) on node B (306B) is re-enabled.

End of Example

Figure 4:
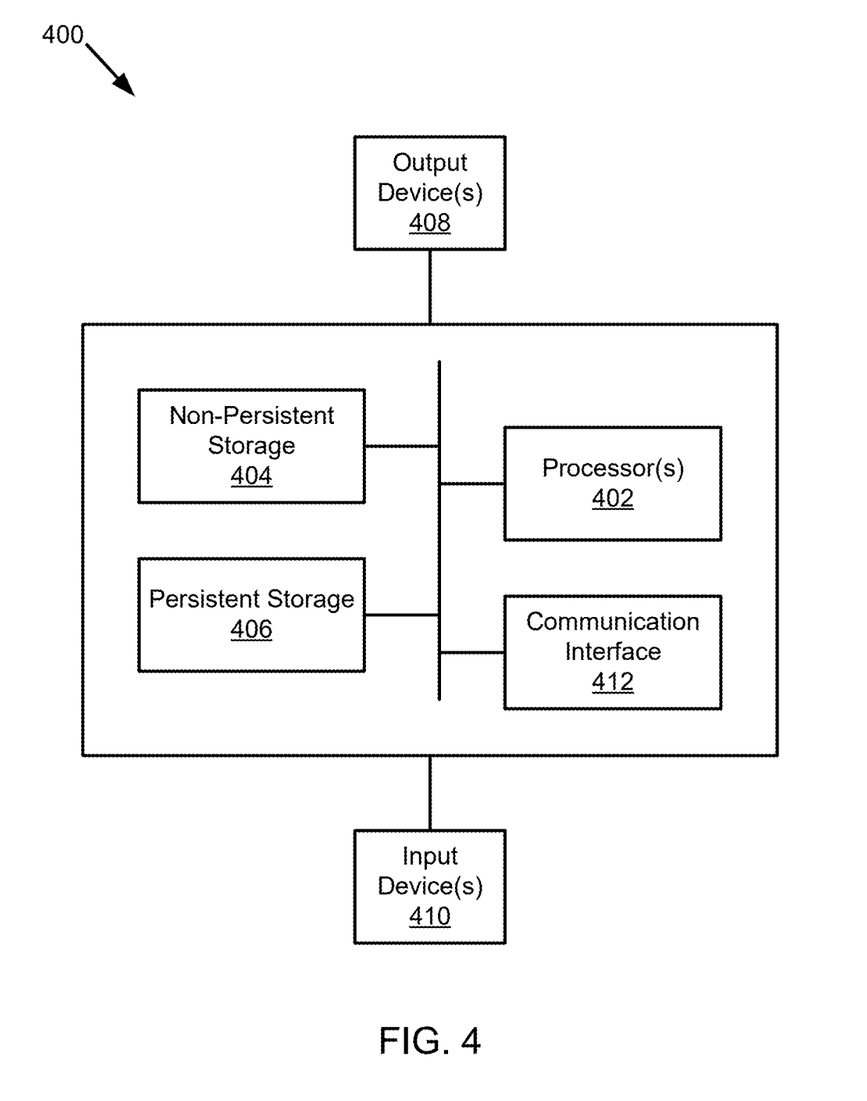
FIG. 4 shows a diagram of a computing device in accordance with one or more embodiments disclosed herein.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing accounts in a cluster, comprising:
    identifying, by an alert manager, an account login alert associated with an account and a node of a cluster, wherein the cluster comprises a plurality of nodes, wherein the node is one of the plurality of nodes;
    in response to the identification: making a first determination that the account login alert exceeds an alert threshold;
    in response to the first determination: disabling a weak authentication method for the account;
    enabling a strong authentication method for the account;
    disabling weak authentication methods for other accounts on the plurality of nodes;
    enabling strong authentication methods for other accounts on the plurality of nodes;
    making a second determination the account is associated with multiple sessions; and in response to the second determination: closing the multiple sessions associated with the account;
    after closing the multiple sessions associated with the account:
    making a third determination that the account login alter is resolved;
    in response to the third determination:
    disabling the strong authentication method for the account;
    enabling the weak authentication method for the account;
    disabling the strong authentication methods for the other accounts on the other nodes; and
    enabling the weak authentication methods in the other accounts on the other nodes.

2. The method of claim 1, wherein the account comprises a user account associated with a user of the cluster.

3. The method of claim 1, wherein enabling the strong authentication methods for other accounts on the plurality of nodes comprises:
    enabling a first strong authentication method for a first account on a first node of the plurality of nodes; and
    enabling a second strong authentication method for a second account on a second node of the plurality of nodes.

4. The method of claim 3, wherein the first strong authentication method and the second strong authentication method are the same strong authentication method.

5. The method of claim 3, wherein the first strong authentication method and the second strong authentication method are different strong authentication methods.

6. The method of claim 5, wherein:
    the first strong authentication method comprises physical authentication at a location of the first node; and
    the second strong authentication method comprises performing authentication with a custom certificate generated prior to identifying the account login alert.

7. The method of claim 1, wherein the weak authentication method comprises verifying a username and password.

8. A non-transitory computer readable medium comprising computer readable program code, which when executed by a computer processor enables the computer processor to perform a method for managing accounts in a cluster, the method comprising:
    identifying, by an alert manager, an account login alert associated with an account and a node of a cluster, wherein the cluster comprises a plurality of nodes, wherein the node is one of the plurality of nodes;
    in response to the identification: making a first determination that the account login alert exceeds an alert threshold;
    in response to the first determination: disabling a weak authentication method for the account;
    enabling a strong authentication method for the account;
    disabling weak authentication methods for other accounts on the plurality of nodes;
    enabling strong authentication methods for other accounts on the plurality of nodes;
    making a second determination the account is associated with multiple sessions; and
    in response to the second determination: closing the multiple sessions associated with the account;
    after closing the multiple sessions associated with the account:
    making a third determination that the account login alter is resolved;
    in response to the third determination:
    disabling the strong authentication method for the account;
    enabling the weak authentication method for the account
    disabling the strong authentication methods for the other accounts on the other nodes; and
    enabling the weak authentication methods in the other accounts on the other nodes.

9. The non-transitory computer readable medium of claim 8, wherein the account comprises a user account associated with a user of the cluster.

10. The non-transitory computer readable medium of claim 8, wherein enabling the strong authentication methods for other accounts on the plurality of nodes comprises:
    enabling a first strong authentication method for a first account on a first node of the plurality of nodes; and enabling a second strong authentication method for a second account on a second node of the plurality of nodes.

11. The non-transitory computer readable medium of claim 10, wherein the first strong authentication method and the second strong authentication method are the same strong authentication method.

12. The non-transitory computer readable medium of claim 10, wherein the first strong authentication method and the second strong authentication method are different strong authentication methods.

13. The non-transitory computer readable medium of claim 12, wherein:
the first strong authentication method comprises physical authentication at a location of the first node; and
the second strong authentication method comprises performing authentication with a custom certificate generated prior to identifying the account login alert.

14. The non-transitory computer readable medium of claim 8, wherein the weak authentication method comprises verifying a username and password.

15. A system for managing accounts in a cluster, comprising: a plurality of nodes of a cluster; and an alert manager of a security information and event manager, comprising a processor and memory, wherein the processor is configured to perform a method comprising:
identifying an account login alert associated with an account and a node of the cluster, wherein the node is one of the plurality of nodes;
in response to the identification: making a first determination that the account login alert exceeds an alert threshold;
in response to the first determination: disabling a weak authentication method for the account;
enabling a strong authentication method for the account;
disabling weak authentication methods for other accounts on the plurality of nodes;
enabling strong authentication methods for other accounts on the plurality of nodes;
making a second determination the account is associated with multiple sessions; and
in response to the second determination: closing the multiple sessions associated with the account;
after closing the multiple sessions associated with the account;
making a third determination that the account login alter is resolved;
in response to the third determination;
disabling the strong authentication method for the account;
enabling the weak authentication method for the account
disabling the strong authentication methods for the other accounts on the other nodes; and
enabling the weak authentication methods in the other accounts on the other nodes.

16. The system of claim 15, wherein the account comprises a user account associated with a user of the cluster.

17. The system of claim 15, wherein enabling the strong authentication methods for other accounts on the plurality of nodes comprises:
enabling a first strong authentication method for a first account on a first node of the plurality of nodes; and
enabling a second strong authentication method for a second account on a second node of the plurality of nodes.

* * * * *